United States Patent
Hetherington

Patent Number: 6,106,035
Date of Patent: Aug. 22, 2000

[54] LOCKING MECHANISM FOR TRANSFORMER ENCLOSURE DOOR

[75] Inventor: David L. Hetherington, Pewaukee, Wis.

[73] Assignee: Maysteel Corporation, Menomonee Falls, Wis.

[21] Appl. No.: 08/971,865

[22] Filed: Nov. 17, 1997

[51] Int. Cl.[7] .................................................. E05C 5/04
[52] U.S. Cl. ...................... 292/251; 292/341.17; 411/433
[58] Field of Search .................... 292/148, 177, 292/205, 251, 341, 341.17, 252; 411/437, 352, 353, 267, 433; 336/90; 174/50; 220/327

[56] References Cited

U.S. PATENT DOCUMENTS

| | | | |
|---|---|---|---|
| 971,375 | 9/1910 | Hays . | |
| 1,856,091 | 7/1932 | Dina | 292/251 |
| 2,401,672 | 6/1946 | Tinnerman | 411/437 |
| 2,814,324 | 6/1957 | Shur | 411/267 |
| 3,089,330 | 5/1963 | Kerr | 292/251 |
| 3,194,107 | 7/1965 | Ballard | 411/437 |
| 3,784,727 | 1/1974 | Haubein | 292/251 |
| 4,113,291 | 9/1978 | Cameron | 174/50 |
| 4,533,786 | 8/1985 | Borgmeyer et al. | 336/90 |
| 5,739,464 | 4/1998 | Adkins et al. | 292/251 |

OTHER PUBLICATIONS

"High Performance Distribution Transformers" Product Guide, Bulletin No. 91016, Mar. 1992, Cooper Power Systems, Transformer Products, 1900 E. North Street, Waukesha, WI 53188–3899.

"Transformer Enclosures...Better Built for Superior Protection and Saftey", Bulletin No. TE–2 8/86/3M, 1986, Maysteel Corporation, Fabrication Division, 800 Horicon Street, Mayville, WI 53050.

"Primary Sectionalizing Enclosures & Ground Sleeves", undated, Maysteel Corporation, Columbus Division, 100 Continental Drive, Columbus, WI, 53925–0248.

*Primary Examiner*—B. Dayoan
*Assistant Examiner*—Gary Estremsky
*Attorney, Agent, or Firm*—Andrus, Sceales, Starke & Sawall

[57] ABSTRACT

A locking mechanism for a door, such as the door of a transformer enclosure, includes a rotatable threaded locking member secured to the door. The locking member is spring biased outwardly, and stationary engagement structure is provided for engaging the threaded locking member when the door attains a predetermined position as the door approaches its closed position. The engagement structure includes a pair of spaced apart engagement members, which are preferably threaded so as to engage the threads of the threaded member as the door is moved toward its closed position. The threaded locking member can than be pushed inwardly, and the engagement members are biased to provide a ratcheting mechanism to prevent the threaded locking member from being withdrawn from between the engagement members. The threaded locking member can than be turned to fully lock the door in its closed position and an auxiliary lock, such as a padlock, is then utilized in combination with the threaded locking member to prevent access to the head of the threaded locking member and to provide a backup lock for securing the door in its closed position.

24 Claims, 3 Drawing Sheets

LOCKING MECHANISM FOR TRANSFORMER ENCLOSURE DOOR

FIELD OF THE INVENTION

This invention relates to a locking arrangement for a door, and more particularly to a locking mechanism for the door of an enclosure, such as a transformer enclosure.

BACKGROUND OF THE INVENTION

A pad-mounted transformer includes an enclosure or tank having a wall to which various components of the transformer are mounted, such as a low voltage bushing, a high voltage bushing, a ground strap, a stand-off bracket, etc. The enclosure includes a door which is movable between an open position providing access to the various components of the transformer, and a closed position preventing access thereto.

In the past, a transformer door is maintained in its closed position by means of a combination bolt and padlock locking arrangement. The sill of the enclosure includes a padlock hasp which extends through a slot formed in a locking bracket mounted to the door, such that the hasp extends through the slot when the door is closed. In this manner, a padlock is secured to the hasp to prevent the door from being moved to its open position. In combination with the padlock and hasp, the prior art contemplates a bolt adapted to extend through an opening formed in the locking bracket and adapted for engagement with a nut mounted to the sill adjacent the padlock hasp. The bolt has an unconventional head, such as a pentagonal head, to prevent the bolt from being disengaged from the nut by unauthorized persons.

In operation, once the door is closed, the user engages the bolt with the nut and fully tightens the bolt. Thereafter, the padlock is engaged with the hasp, and the hasp is preferably located such that the shank of the padlock is located in alignment with the bolt head to prevent access to the bolt head.

BRIEF SUMMARY OF THE INVENTION

It is an object of the present invention to provide a locking arrangement for an enclosure, such as a transformer door, which provides a positive engagement of the door as the door is moved toward its closed position, to prevent the door from being moved to its open position. It is a further object of the invention to provide such a locking arrangement which employs a generally similar bolt and padlock arrangement as in the prior art. Yet another object of the invention is to provide a locking arrangement which engages the threads of the locking bolt as the door is moved toward its closed position, so as to prevent return of the door to its open position. And still further object of the invention is to provide a locking arrangement which is relatively simple in its components and construction and which entails modifications of the prior art in order to prevent the door from being opened once the door attains a predetermined closed position.

The invention contemplates an improvement in a door arrangement for an enclosure, such as a transformer enclosure. The door arrangement includes a door member movable between an open position and a closed position. In its closed position, the door is located adjacent stationary wall structure associated with the enclosure, and a rotatable locking member including a threaded portion is mounted to the door. The improvement of the invention contemplates engagement structure associated with the stationary wall structure for initially engaging the threaded portion of the locking member, without rotation of the locking member, as the door approaches the stationary wall structure during movement from its open position toward its closed position. This engagement with the threaded portion of the locking member prevents the door from movement toward its open position once the door has attained a predetermined position relative to the wall structure as the door is closed. The locking member is subsequently rotatable after its initial engagement with the engagement structure for cooperation with the engagement structure, to tighten the locking member to securely maintain the door in its closed position.

The locking member is preferably in the form of a bolt having a head and the threaded portion of the locking member is formed on a shank of the bolt extending from the head. The shank is adapted to extend through an opening formed in the door, such that the head and the shank are disposed on opposite sides defined by the door. The bolt shank extends through retainer structure which functions to maintain the bolt in position within the door opening. The retainer structure may be in the form of a disk-like member disposed between the threaded portion of the shank and the bolt head, and engaged within a recess located between the bolt head and the threaded shank of the bolt. The disk-like member may include one or more tabs configured so as to engage the threaded portion of the shank and prevent passage of the shank through the opening. A biasing element, such as a spring, is preferably interposed between the door and the bolt head for biasing the threaded portion of the shank toward the door. In this manner, the bolt head can be manually engaged by a user and moved toward the door against the force of the biasing element, for advancing engagement of the threaded shank with the engagement structure. The biasing element may be positioned so as to bias the threaded shank of the bolt into engagement with the retainer member.

The engagement structure preferably is in the form of a pair of engagement members movably mounted to the stationary wall structure adjacent the opening. Each engagement member includes an engagement end located adjacent the opening, and arranged such that the engagement ends face each other and a space is located therebetween for receiving the threaded shank of the bolt. Each engagement member is preferably mounted to the stationary wall structure so as to be pivotable about a pivot axis spaced from the engagement end defined by the engagement member. Each engagement member is movable between a first engaging position in which it abuts the stationary wall structure adjacent the opening, and a second engaging position in which at least the engagement end defined by the engagement member is moved away from the stationary wall structure. A biasing element, such as a spring, is engaged with each engagement member for urging each engagement members toward its first engaging position. A wall is spaced from eacit engagement member, and the spring is engaged between the wall and the engagement member. In a preferred form, the wall is an end wall defined by an engagement housing mounted to the stationary wall structure, which further includes a pair of sidewalls mounted to the stationary wall structure and between which the end wall extends. In a preferred form, each engagement member is pivotably mounted to and between the sidewalls of the engagement housing.

With the above-described arrangement, the engagement members engage the threaded shank of the locking bolt as the door is moved toward its closed position. The biasing force exerted on the engagement members functions to maintain engagement of the engagement members with the threaded shank, without rotation of the bolt, to grip the bolt shank and prevent the door from movement toward its open position without rotation of the bolt, after the door has reached a pre-determined closed position relative to the stationary wall structure. The locking bolt can be pushed inwardly as the door is moved further towards its closed position, with the biasing force exerted on the engagement members providing a ratchet effect to continue engagement of the engagement members with the threaded bolt shank during such movement of the bolt. The user then engages the bolt head with a wrench so as to turn the bolt toward a fully tightened position to securely maintain the door in its closed position. A padlock is then engaged with a hasp located adjacent the bolt head, to prevent access to the bolt head and removal of the bolt.

It can thus be appreciated that the invention provides a positive engagement arrangement for preventing subsequent opening of the door after the door has attained a pre-determined closed position, without any action on the part of the user in engaging the locking bolt after the door has been closed. The invention further provides positive engagement of the locking bolt with the door, to insure that the locking bolt cannot be lost or stolen.

Various other features, objects and advantages of the invention will be made apparent from the following detailed description taken together with the drawings.

BRIEF DESCRIPTION OF THE SEVERAL VIEWS OF THE DRAWING

The drawings illustrate the best mode presently contemplated of carrying out the invention.

In the drawings.

DETAILED DESCRIPTION OF THE INVENTION

Figure 1:
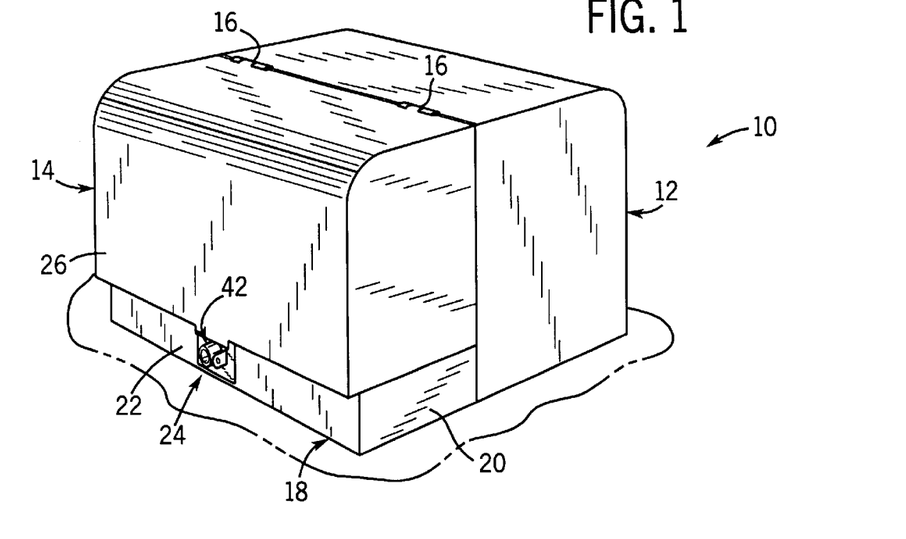
FIG. 1 is an isometric view of a pad-mounted transformer incorporating the locking arrangement the present invention.

FIG. 1 illustrates a pad-mounted transformer 10 which includes an external housing having a tank cover portion 12 and a door 14 pivotably mounted to tank cover portion 12 by hinges 16. A sill 18 is mounted to the lower front of tank cover portion 12, extending forwardly therefrom. Sill 18 includes a pair of sidewalls 20 and an end wall 22 extending between the forward ends of sidewalls 20.

Door 14 is movable between a closed position as shown in FIG. 1 and an open position in which door 14 is pivoted about hinges 16 relative to tank cover portion 12. In its open position, door 14 provides access to the internal components of transformer 10 mounted to the front plate of tank cover portion 12, in a manner as is known.

Figure 2:
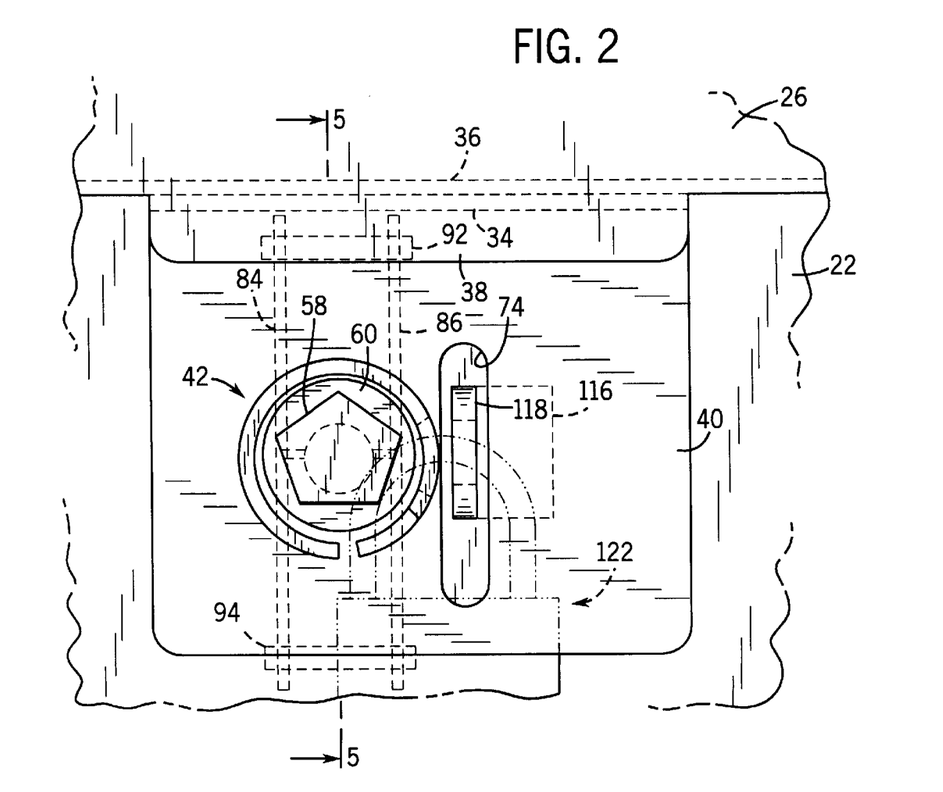
FIG. 2 is an enlarged partial elevation view of the locking arrangement incorporated into the transformer enclosure of FIG. 1.
Figure 3:
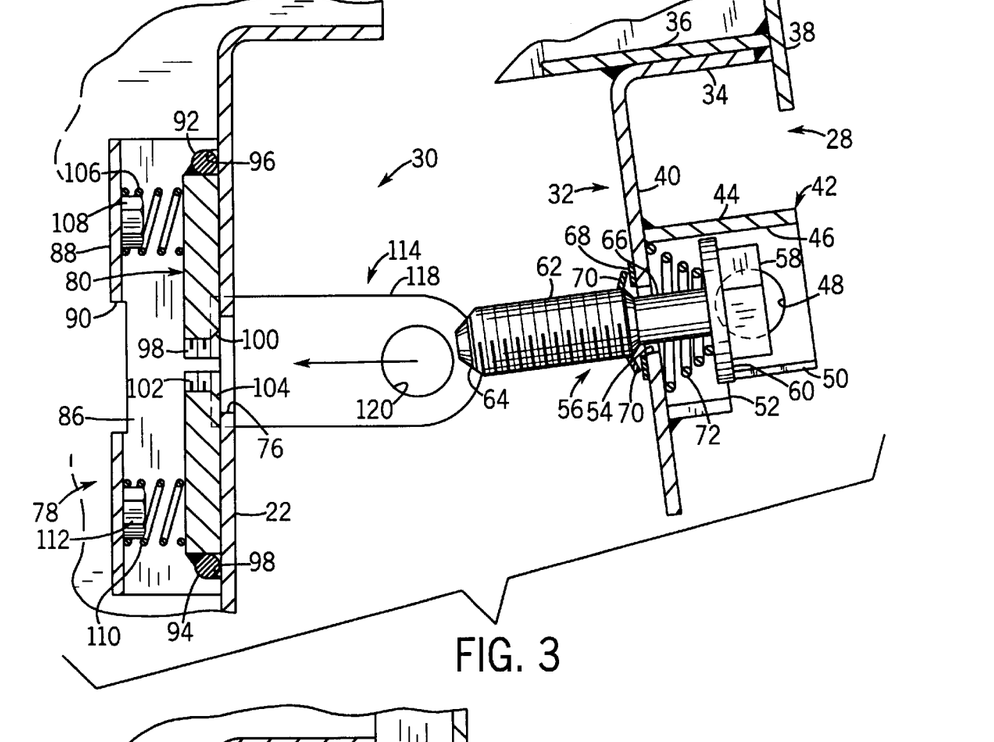
FIG. 3 is a partial section view of the locking arrangement of FIG. 2, showing movement of the transformer door toward its closed position.

A locking arrangement, shown generally at 24, is interposed between sill end wall 22 and the end wall of door 14, shown at 26, for selectively maintaining door 14 in its closed position and allowing door 14 to be moved to its open position. Referring to FIGS. 2 and 3, locking arrangement 24 includes a door-mounted portion 28 and a sill-mounted portion 30.

Door-mounted portion 28 of locking arrangement 24 includes an inverted L-shaped bracket member 32 having an upper leg 34 mounted to a horizontal cross-member 36 which extends rearwardly from the lower end of door end wall 26. A central tab handle portion 38 depends from the lower edge of door end wall 26, and is located forwardly of bracket member upper leg 34. Bracket member 32 further defines a vertical leg 40 which extends perpendicularly to upper leg 34 and downwardly from horizontal cross-member 36.

A sleeve 42 is mounted to the outer surface of bracket member vertical leg 40. Sleeve 42 is defined by a generally circular wall 44 welded at its inner end to the outer surface of bracket member vertical leg 40, defining an internal passage 46. An opening 48 is formed in wall 44. In addition, a slot 50 extends from the outer end of wall 44 inwardly throughout a portion of the length of wall 44, terminating at an inner edge 52 spaced from the outer end of wall 44 approximately the same distance as the inner edge of opening 48. Sleeve 42 may be mounted to bracket member vertical leg 48 in a satisfactory manner, such as by welding wall 44 to bracket member vertical leg 40. An opening 54 is formed in bracket member vertical leg 40. Opening 54 is located so as to be approximately coincident with the longitudinal axis of sleeve passage 46. A locking bolt, shown generally at 56, extends through opening 54.

Locking bolt 56 includes a head 58 including a disk-like shoulder 60. Head 58 has an unconventional configuration, such as a pentagonal configuration as shown in FIG. 2. Locking bolt 56 further includes a threaded shank 62 including a tapered nose 64, and a neck portion 66 located between the inner end of threaded shank 62 and shoulder 60. Neck portion 66 has a diameter less than that of threaded shank 62.

A retaining washer 68 functions to retain locking bolt 56 within opening 54, which is sized so as to enable threaded shank 62 to pass therethrough. Retaining washer 68 defines a central opening for receiving threaded shank 62, and further includes a series of tabs 70 which are bent inwardly after passage of shank 62 through the central opening defined by retaining washer 68, so as to restrict the effective diameter of retaining washer 68 and to engage the inner end of threaded shank 62 adjacent the outer end of neck portion 66. With this construction, once tabs 70 are bent as shown, engagement of tabs 70 with the inner end of threaded shank 62 prevents locking bolt 56 from being withdrawn through opening 54.

A spring 72 is interposed between bracket member vertical leg 40 and shoulder 60. Spring 72 defines a relatively wide inner end which engages the outer surface of bracket member vertical leg 40, tapering to a relatively narrow outer end which engages the inwardly facing surface of shoulder 60. Spring 72 functions to bias locking bolt 56 outwardly relative to bracket member vertical leg 40, as shown in FIG. 3, to a position in which tabs 70 engage the inner end of threaded shank 62 to maintain locking bolt 56 generally perpendicular to the plane of bracket member vertical leg 40.

As shown in FIG. 2, a generally vertical slot 74 is formed in bracket member vertical leg 40 adjacent sleeve 42.

Referring to FIG. 3, an opening 76 is formed in sill end wall 22. Opening 76 has a diameter greater than that of opening 54 in bracket member vertical leg 40, for reasons which will be explained, and is positioned so as to be generally concentric with opening 54 when door 14 is in its closed position.

Figure 6:
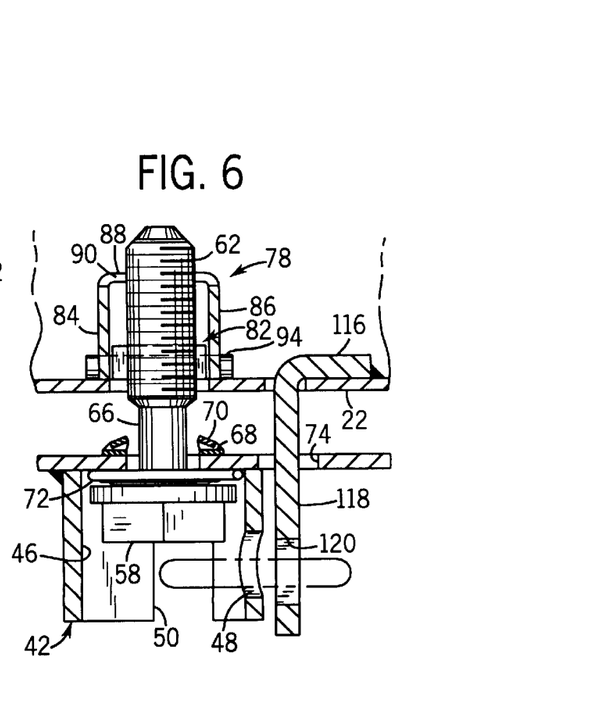
FIG. 6 is a section view taken along lines 6 of FIG. 5.

Sill-mounted portion 30 of locking arrangement 24 generally includes a housing 78 mounted to the inside surface of sill end wall 22, and upper and lower engagement members 80, 82, respectively, pivotably mounted to housing 78 in a manner to be explained. Referring to FIGS. 3 and 6, housing 78 includes a pair of side walls 84, 86 and an end wall 88 extending between and interconnecting the outer ends of side walls 84, 86. A central opening 90 is formed in housing end wall 88.

Upper engagement member 80 has a hinge pin 92 secured to its upper end, such as by welding. Similarly, a hinge pin 94 is connected to the lower end of lower engagement member 82, again such as by welding, Engagement members 80, 82 have a width slightly less than the spacing between housing side walls 84, 86, so as to be received in the space therebetween as shown in FIG. 6. Hinge pins 92, 94 have a length greater than the spacing between housing side walls 84, 86, so as to extend outwardly of housing side walls 84, 86 through notches formed therein, such as shown at 96, 98 (FIG. 3), as illustrated in FIG. 6. The notches such as 96, 98, formed in housing side walls 84, 86 are sized so as to capture the hinge pins, such as 92, 94 against the inner surface of sill end wall 22 such that, when housing 78 is mounted to sill end wall 22, hinge pins 92, 94 function to pivotably mount engagement members 80, 82 to housing 78 and sill end wall 22. The width of engagement members 80, 82 relative to the space between housing side walls 84, 86 prevents longitudinal movement of hinge pins 92,94, such that engagement members 80, 82 are fixed axially and longitudinally and are pivotable about pivot axes defined by hinge pins 92, 94 respectively.

Engagement member 80 defines a lower engagement end having an arcuate threaded recess 98 and an arcuate tapered entryway 100. Similarly, lower engagement member 82 defines an upper engagement end having an arcuate threaded recess 102 and an arcuate tapered entryway 104. Threaded recesses 98, 102 face each other, and each defines a radius slightly greater than the radius of locking bolt threaded shank 62, such that the facing engagement ends of engagement members 80, 82 define a split nut assembly for threadably receiving and engaging threaded shank 62.

A spring 106 extends between the inside surface of housing end wall 88 and the outwardly facing surface of engagement member 80. A stud 108 is mounted to the inside surface of housing end wall 88, to maintain spring 106 in position. Similarly, a spring 110 extends between the inside surface of housing end wall 88 and the outwardly facing surface of lower engagement member 82. A stud 112 is mounted to the inside surface of housing end wall 88, to maintain spring 110 in position. Springs 106, 110 function to bias engagement members 80, 82 respectively toward a first engaging position in which engagement members 80, 82 abut sill end wall 22, as shown in FIG. 3.

Referring to FIGS. 2 and 3, a hasp member 114 is mounted to sill end wall 22. Hasp member 114 includes a base 11 6 secured to sill end wall 22 such as by welding and a body section 118 extending generally perpendicularly outwardly from sill end wall 22. An opening 120 is formed in body section 118 toward its outer end.

Figure 4:
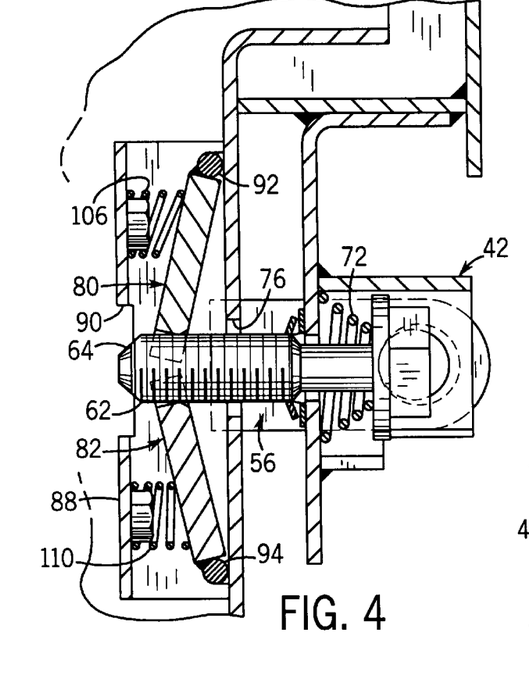
FIG. 4 is a view similar to FIG. 3, showing initial engagement of the locking bolt with the engagement members.

In operation, locking arrangement 24 functions as follows. When it is desired to move transformer door 14 from its open position to its closed position, door 14 is pivoted about hinges 16 so as to move door 14 toward sill 18. FIG. 3 shows the position of the doormounted portion 28 of locking arrangement 24 as door 14 approaches its closed position. As shown in FIG. 3, threaded shank 62 of locking bolt 56 is generally in alignment with opening 76 in sill end wall 22 as door 14 is moved toward its closed position. Spring 72 and retaining washer 68 function to maintain locking bolt 56 in a fixed generally perpendicular orientation relative to bracket member vertical leg 40, and thereby maintain threaded shank 62 in a constant position in alignment with opening 76. Upon continued movement of door 14, tapered nose 64 engages tapered entryways 100, 104 of engagement members 80, 82, respectively, and arcuate threaded recesses 98, 102, to simultaneously pivot engagement members 80, 82 toward a second engaging position as shown in FIG. 4. In this position, upper engagement member 80 is pivoted about its hinge pin 92 in a clockwise direction such that the threads of arcuate threaded recess 98 engage threaded shank 62. Similarly, lower engagement member 82 pivots in a counterclockwise direction about hinge pin 94 such that the threads of arcuate threaded recess 102 engage threaded shank 62. Springs 106, 110 bias engagement members 80, 82, respectively, toward sill end wall 22 to maintain engagement of threaded recesses 98, 102, respectively, with threaded shank 62.

The axial inward movement of locking bolt 56, caused by movement of door 14 toward its closed position, advances threaded shank 62 between engagement members 80, and 82. During such movement of threaded shank 62, springs 106, 110 continually bias engagement members 80, 82 respectively, toward sill end wall 22, thereby biasing the threads of arcuate threaded recesses 98, 102, respectively, into engagement with threaded shank 62. This provides a ratcheting action in which springs 106, 110 maintain the engagement ends of engagement members 80, 82 respectively, in engagement with threaded shank 62, such that the threads of threaded shank 62 are "gripped" between engagement members 80 and 82 as threaded shank 62 is advanced therebetween. When engagement members 80, 82 are pivoted in this manner to their second engaging position of FIG. 4 by axial inward movement of threaded shank 62 therebetween, the threads of shank 62 are gripped by the initial thread of each threaded recess 98, 102, respectively, immediately adjacent arcuate tapered entryway 100, 104, respectively, as shown in FIG. 4. As can thus be appreciated, the initial movement of threaded shank 62 into engagement with the threads of arcuate threaded recesses 98, 102 as door 14 approaches its closed position prevents axial outward movement of locking bolt 56, thereby preventing subsequent movement of door 14 toward its open position.

Figure 5:
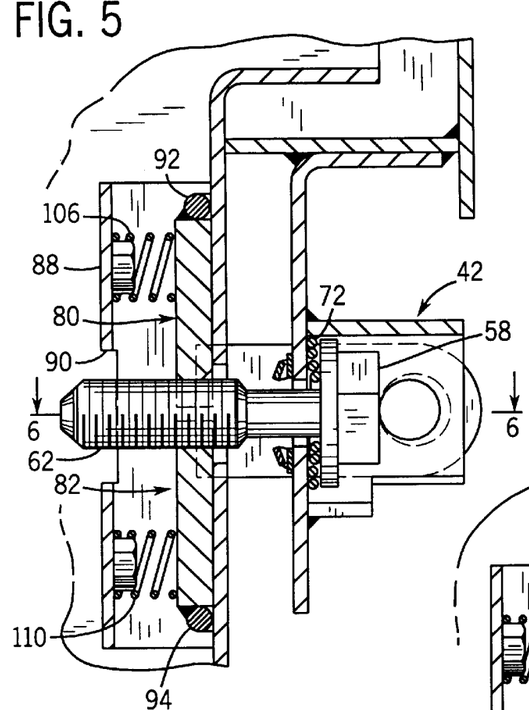
FIG. 5 is a section view taken along line 5—5 of FIG. 2, and similar to FIGS. 3 and 4, showing the locking bolt fully tightened and the engagement members moved to their fully engaged position.

After locking bolt 56 has been initially engaged with engagement members 80 and 82 as described above, the user can engage locking bolt head 58 with his or her finger and manually push locking bolt 56 axially inwardly against the force of spring 72, to continue advancement of shank 62 between engagement members 80, 82. The user then engages a socket wrench with head 58, and turns locking bolt 56 so as to continue advancement of locking bolt 56 between engagement member 80 and 82. The user continues such rotation of locking bolt 56 until locking bolt 56 attains its fully engaged position as shown in FIG. 5. In this position, spring 72 is fully compressed between shoulder 60 and the outer surface of bracket member vertical wall 40. The turning of threaded shank 62 relative to engagement members 80 and 82 causes engagement members 80 and 82 to return to their first engaging position, in which engagement members 80 and 82 engage sill end wall 22. As locking bolt 56 is tightened, engagement members 80 and 82 engage housing side walls 84, 86 to prevent showing of engagement members 80 and 82. As noted above, arcuate threaded recesses 98, 102 define an effective diameter only slightly larger than that of threaded shank 62 such that, when locking bolt 56 is fully advanced, the space between the facing ends of engagement members 80 and 82 receives threaded shank 62. As shown in FIG. 5, shank 62 passes through opening 90 in housing end wall 88 during movement toward its fully advanced position.

During movement of door 14 toward its closed position, long body section 118 passes through slot 74 in vertical wall 40. Once locking bolt 56 is in its fully advanced position of FIG. 5, the user places the shank of a padlock through hasp opening 120 and through sleeve opening 48, which are aligned with each other when door 14 is fully closed. The padlock is then locked, so as to prevent access to bolt head 58 and to provide a second lock, separate from locking bolt 56, to maintain door 14 in its closed position. FIG. 2 illustrates a padlock, shown in phantom at 122, in which the padlock shank and body portion are positioned as described. The shank of padlock 122 is received in slot 50 formed in sleeve wall 46 to enable padlock to hang vertically.

To open door 14, the operator first removes padlock 122 so as to withdraw the padlock shank from sleeve opening 48 and hasp opening 120. The user then engages bolt head 58 with a mating socket wrench, and turns locking bolt 56 so as to withdraw threaded shank 62 from between the ends of engagement members 80 and 82 until threaded shank 62 is fully disengaged from threaded recesses 98, 102, respectively. Spring 72 assists in moving bolt head 52 outwardly as locking bolt 56 is loosened, to maintain engagement between bolt head 58 and the socket. The user continues turning locking bolt 56 and exerts an opening force on door 14, so as to move door 14 toward its open position once threaded, shank 62 is fully disengaged from arcuate threaded recesses 98, 102. This enables movement of door 14 to its fully open position to provide access to the components of transformer 10 enclosed by door 14.

Figure 7:
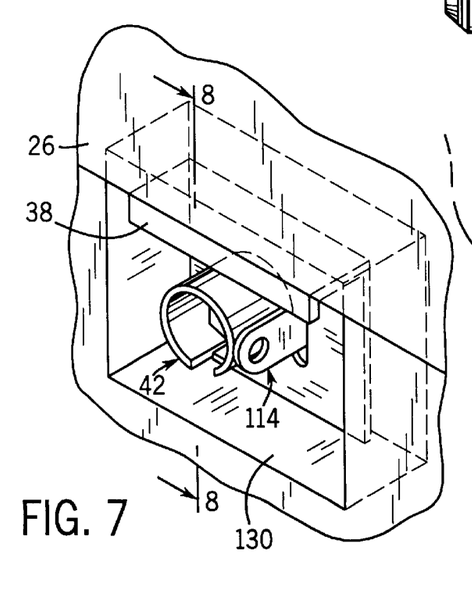
FIG. 7 is a partial isometric view of an alternate embodiment of the locking arrangement of the present invention.
Figure 8:
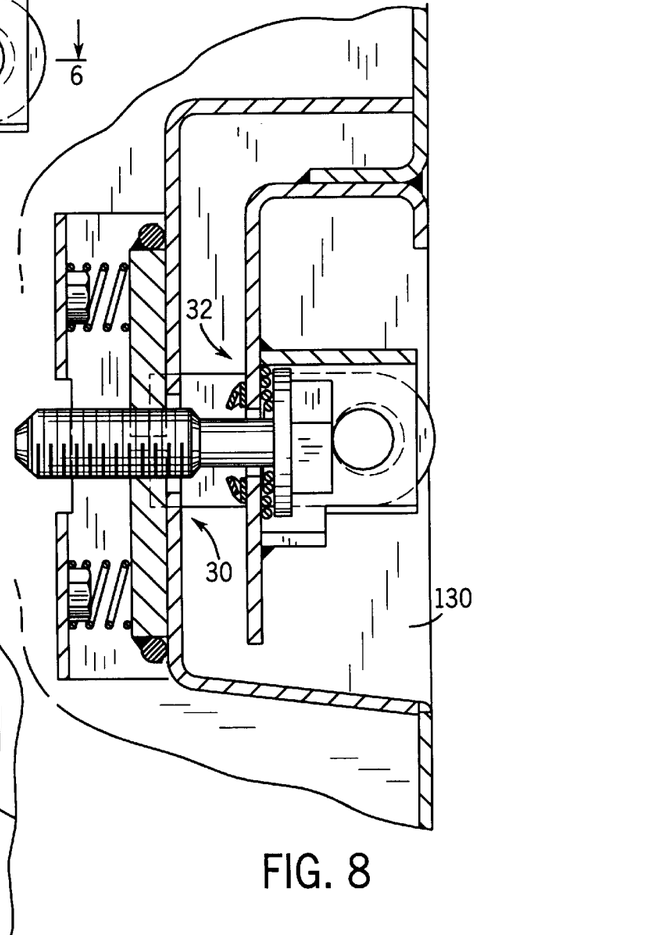
FIG. 8 is a section view taken along line 8—8 of FIG. 7.

FIGS. 7 and 8 illustrate a flush sill configuration for transformer 10, in which sill end wall 22 is flush with door end wall 26 when door 14 is fully closed. In this configuration, sill-mounted portion 30 of locking arrangement 24 is mounted within a pocket defined by sill 18, shown at 130. Sill pocket 130 is defined by an inner wall analogous to sill inner wall 22, in combination with upper and lower walls and a pair of sidewalls which together define a recess within which door-mounted portion 28 of locking arrangement 24 is received when door 14 is closed. In all other respects, however, the mechanism of FIGS. 7 and 8 is identical in construction and operation to that of FIGS. 1–6 as shown and described above.

It can thus be appreciated that the invention provides a locking arrangement for positively engaging a threaded locking member, such as locking bolt 56, with stationary engagement structure when the door attains a predetermined position as it is being moved toward its closed position, to prevent subsequent opening of the door without rotation of the locking member. Further, the invention provides an arrangement for positively maintaining a locking bolt in engagement with a door, to insure that the locking bolt cannot be lost or misplaced. The invention further provides a relatively simple modification to existing components to increase the overall safety of a transformer enclosure and to provide a simple and quick arrangement for preventing the door from being opened without rotation of the locking member.

It is recognized that other equivalents, alternatives, and modifications aside from those expressly stated, are possible and within the scope of the appended claims.

I claim:

1. In a door arrangement for an enclosure, wherein the door arrangement includes a door movable between an open position and a closed position in which the door is located adjacent stationary wall structure associated with the enclosure, the improvement comprising:

a locking member mounted to the door, wherein the locking member includes an axially extending shank having an end and including a series of axially spaced engagement ridges thereon, and wherein the locking member is mounted to the door by a mounting arrangement providing axial movement of the mounting member relative to the door along the longitudinal axis of the shank in response to an axial force thereon, without rotation of the locking member;

engagement structure mounted to the stationary wall structure, wherein the engagement structure includes a pair of movable engagement members configured and arranged to engage the engagement ridges of the locking member inwardly of the end of the locking member upon axial movement of the locking member between the engagement members;

wherein the locking member is axially movable relative to the door in response to application of an axial force to the locking member, after the door is in its closed position, for moving the locking member between the engagement members for advancing engagement of the engagement ridges with the engagement members;

wherein the locking member is rotatably mounted to the door and wherein the engagement ridges comprise threads formed on the shank, wherein the locking member comprises a bolt having a head, and wherein the threads are formed on a threaded portion of the shank which extends from the bolt head through an opening formed in the door, wherein the head and the shank are disposed on opposite sides defined by the door;

wherein the pair of movable engagement members are configured and located so as to engage the threads on the locking member shank inwardly of the end of the locking member shank without rotation of the locking member, as the door approaches the stationary wall structure during movement from its open position toward its closed position, to prevent the door from movement toward its open position; and a biasing element interposed between the door and the bolt head for biasing the threaded portion of the shank toward the door, wherein axial movement of the bolt relative to the door is caused by manual engagement of the bolt head by a user and movement of the bolt head toward the door against the force of the biasing element for advancing engagement of the threaded portion of the shank with the engagement structure.

2. The improvement of claim 1, further comprising retainer structure through which the bolt shank extends for mounting the bolt in position within the door opening.

3. The improvement of claim 2, wherein the shank includes a recess located between the head and the threaded portion formed on the shank, and wherein the retainer structure comprises a disk-like member disposed between the threaded portion of the shank and the door, wherein the disk-like member includes one or more tabs configured so as to engage the threaded portion of the shank and prevent passage of the shank through opening.

4. The improvement of claim 1, wherein the shank includes a recess located between the head and the threaded portion, and further comprising a retainer member disposed between the threaded portion of the shank and the door within the shank recess and configured so as to engage the threaded portion of the shank and prevent passage of the shank through the door opening, and wherein the biasing element functions to move the bolt within the door opening to a position wherein the threaded portion engages the retainer member.

5. The improvement of claim 1, wherein the engagement members are movably mounted to the stationary wall structure adjacent an opening in the stationary wall structure through which the threaded portion of the shank passes as the door is moved toward its closed position.

6. The improvement of claim 5, wherein each engagement member defines an engagement end located adjacent the opening in the stationary wall structure, wherein the engagement ends defined by the engagement members face each other and a space is located therebetween for receiving the threaded portion of the shank, and wherein each engagement member is pivotably mounted to the stationary wall structure at a location spaced from the engagement end defined by the engagement member.

7. In a door arrangement for an enclosure, wherein the door arrangement includes a door movable between an open position and a closed position in which the door is located adjacent stationary wall structure associated with the enclosure, the improvement comprising:

a locking member mounted to the door, wherein the locking member includes an axially extending shank having an end and including a series of axially spaced engagement ridges thereon, and wherein the locking member is mounted to the door by a mounting arrangement providing axial movement of the mounting member relative to the door along the longitudinal axis of the shank in response to an axial force thereon, without rotation of the locking member;

engagement structure mounted to the stationary wall structure, wherein the engagement structure includes a pair of movable engagement members configured and arranged to engage the engagement ridges of the locking member inwardly of the end of the locking member upon axial movement of the locking member between the engagement members, wherein the engagement structure comprises a pair of engagement members movably mounted to the stationary wall structure adjacent an opening in the stationary wall structure through which the threaded portion of the shank passes as the door is moved toward its closed position, wherein each engagement member defines an engagement end located adjacent the opening in the stationary wall structure, wherein the engagement ends defined by the engagement members face each other and a space is located therebetween for receiving the threaded portion of the shank, and wherein each engagement member is pivotably mounted to the stationary wall structure at a location spaced from the engagement end defined by the engagement member, wherein each engagement member is pivotably mounted to the stationary wall structure by means of a pivot pin to which the engagement member is mounted for pivoting movement;

wherein the locking member is axially movable relative to the door in response to application of an axial force to the locking member, after the door is in its closed position, for moving the locking member between the engagement members for advancing engagement of the engagement ridges with the engagement members;

wherein the locking member is rotatably mounted to the door and wherein the engagement ridges comprise threads formed on the shank, wherein the locking member comprises a bolt having a head, and wherein the threads are formed on a threaded portion of the shank which extends from the bolt head through an opening formed in the door, wherein the head and the shank are disposed on opposite sides defined by the door; and wherein the pair of movable engagement members are configured and located so as to engage the threads on the locking member shank inwardly of the end of the locking member shank, without rotation of the locking member, as the door approaches the stationary wall structure during movement from its open position toward its closed position, to prevent the door from movement toward its open position.

8. The improvement of claim 7, wherein each engagement member is movable between a first engaging position in which the engagement member abuts the stationary wall structure adjacent the opening therein and a second engaging position in which at least the engagement end defined by each engagement member is moved away from the stationary wall structure adjacent the opening therein.

9. In a door arrangement for an enclosure, wherein the door arrangement includes a door member movable between an open position and a closed position in which the door is located adjacent stationary wall structure associated with the enclosure, and wherein a rotatable locking member including a threaded portion is mounted to the door, wherein the locking member comprises a bolt having a head, and wherein the threaded portion is formed on a shank extending from the bolt head through an opening formed in the door, wherein the shank defines an end opposite the head and wherein the head and the shank are disposed on opposite sides defined by the door, the improvement comprising:

a pair of engagement members movably mounted to the stationary wall structure adjacent an opening in the stationary wall structure through which the threaded portion of the shank passes as the door is moved toward its closed position, wherein each engagement member defines an engagement end located adjacent the opening in the stationary wall structure, wherein the engagement ends defined by the engagement members face each other and a space is located therebetween for receiving the threaded portion of the shank, and wherein each engagement member is pivotably mounted to the stationary wall structure at a location spaced from the engagement end defined by the engagement member by means of a pivot pin to which the engagement member is mounted for pivoting movement, wherein each engagement member is movable between a first engaging position in which the engagement member abuts the stationary wall structure adjacent the opening therein and a second engaging position in which at least the engagement end defined by each engagement member is moved away from the stationary wall structure adjacent the opening therein; and a biasing element engaged with each engagement member for urging each engagement member toward its first engaging position;

wherein the engagement members are oriented such that the engagement ends of the engagement member are operable to engage the threaded portion of the locking member inwardly of the end of the shank of the locking member in response to axial movement of the locking member shank therebetween, without rotation of the locking member, as the door approaches the stationary wall structure during movement from its open position toward its closed position to prevent the door from movement toward its open position, wherein the locking member is rotatable after its initial engagement with the engagement members for cooperation with the engagement members to maintain the door in its closed position.

10. The improvement of claim 9, further comprising a wall spaced from and overlying each engagement member, and wherein the biasing element comprises a spring engaged with the wall and with the engagement member.

11. The improvement of claim 10, wherein the wall comprises an end wall defined by an engagement housing mounted to the stationary wall structure, wherein the engagement housing further includes a pair of sidewalls between which the end wall extends, and wherein the side walls are mounted to the stationary wall structure at a location spaced from the end wall to mount the engagement housing to the stationary wall structure.

12. The improvement of claim 11, wherein each engagement member is pivotably mounted to and between the engagement housing side walls.

13. A locking arrangement for an enclosure having a door movable between an open position and a closed position, wherein the enclosure includes a stationary wall and wherein at least a portion of the door is located adjacent the stationary wall when the door is in its closed position, the locking arrangement comprising:

a locking member adapted to be secured to one of the door and the stationary wall and including a threaded section terminating in an end;

engagement structure adapted to be secured to the other of the door and the stationary wall, wherein the engagement structure comprises a pair of pivotable engagement members, wherein each engagement member is pivotable about a pivot axis and defines an engagement end spaced from the pivot axis, wherein the engagement members are pivotable from a first engaging position when the door is in its open position to a second engaging position in which the engagement members are moved apart from each other in response to engagement of the end of the locking member with the engagement ends of the engagement members and axial movement of the locking member threaded section therebetween as the door is moved from its open position toward its closed position, wherein each engagement member is mounted to a pivot pin which defines a pivot axis for the engagement member, wherein the pivot axes defined by the pivot pins are parallel to each other and are transverse to a longitudinal axis defined by each engagement member, wherein the engagement ends of the engagement members are operable to engage the threaded section of the locking member inwardly of the end of the threaded section as the door is moved from its open position toward its closed position without relative rotation between the engagement structure and the threaded section to prevent the door from movement toward its open position; and wherein at least one of the engagement structure and the locking member is rotatable relative to the other after initial engagement between the threaded section and the engagement structure to move the engagement members from the second engaging position toward the first engaging position for drawing the engagement structure and the locking member together to maintain the door in its closed position.

14. The locking arrangement of claim 13, wherein the engagement members are movable about their respective pivot axes apart from each other in response to axial movement of the threaded section of the locking member therebetween, and are movable toward each other upon rotation of the locking member.

15. The locking arrangement of claim 14, wherein the locking member is adapted for mounting to a door by a mounting arrangement providing axial movement of the locking member relative to the door along a longitudinal axis defined by the threaded section of the locking member, wherein the locking member is axially movable relative to the door between the engagement members for advancing engagement of the threaded section of the locking member with the engagement members.

16. The locking mechanism of claim 13, further comprising a biasing element engaged with each engagement member for urging the engagement members toward an initial engagement position in which ends of the engagement members are located adjacent each other with a space therebetween for receiving the threaded portion of the locking member.

17. In an enclosure having a door movable between an open position and a closed position, wherein the enclosure includes a stationary wall and wherein at least a portion of the door is located adjacent the stationary wall when the door is in its closed position, the improvement comprising:

a locking member adapted to be secured to one of the door and the stationary wall and including a threaded section terminating in an end; and engagement structure adapted to be secured to the other of the door and the stationary wall, wherein the engagement structure comprises a pair of pivotable engagement members, wherein each engagement member is pivotable about a pivot axis and defines an engagement end spaced from the pivot axis, wherein the engagement members are pivotable from a first engaging position when the door is in its open position to a second engaging position in which the engagement members are moved apart from each other in response to engagement of the end of the locking member with the engagement ends of the engagement members and axial movement of the locking member threaded section therebetween as the door is moved from its open position toward its closed position, wherein the engagement ends of the engagement members are operable to engage the threaded section of the locking member inwardly of the end of the threaded section as the door is moved from its open position toward its closed position without relative rotation between the engagement structure and the threaded section to prevent the door from movement toward its open position;

wherein at least one of the engagement structure and the locking member is rotatable relative to the other after initial engagement between the threaded section and the engagement structure to move the engagement members from the second engaging position toward the first engaging position for drawing the engagement structure and the locking member together to maintain the door in its closed position; and wherein the locking member is mounted to the door for axial movement relative to the door along a longitudinal axis defined by the threaded section on the locking member, wherein the locking member is axially movable relative to the door after the door is in its closed position for advancing engagement of the engagement members with the locking member threaded section while the engagement members are in the second engaging position.

18. The improvement of claim 17, further comprising a biasing element interposed between the door and the locking member for biasing the threaded section of the locking member toward the door, wherein axial movement of the locking member relative to the door is caused by manual engagement of the locking member by a user and movement of the locking member against the force of the biasing element for advancing engagement of the threaded section of the locking member with the engagement members.

19. The improvement of claim 18, wherein the engagement members are pivotably mounted to the wall adjacent an opening therein through which the threaded section of the locking member passes as the door is moved toward its closed position.

20. The improvement of claim 19, wherein each engagement member defines an engagement end located adjacent the opening in the stationary wall, wherein the engagement ends defined by the engagement members face each other and a space is located therebetween for receiving the threaded section of the locking member, and wherein each engagement member is pivotably mounted to the stationary wall at a location spaced from the engagement end defined by the engagement member.

21. The improvement of claim 20, wherein each engagement member is movable between a first engaging position in which the engagement member abuts the stationary wall adjacent the opening and a second engaging position in which at least the engagement end defined by each engagement member is moved away from the stationary wall adjacent the opening.

22. The locking arrangement of claim 20, further comprising a biasing element engaged with each engagement member for urging each engagement member toward its first engaging position.

23. In an enclosure having a door movable between an open position and a closed position, wherein the enclosure includes a stationary wall and wherein at least a portion of the door is located adjacent the stationary wall when the door is in its closed position, the improvement comprising:

a bolt member mounted to the door and having a threaded portion;

a pair of engagement members mounted to the stationary wall, each engagement member having a threaded surface at one end, wherein the engagement members are oriented such that the threaded surfaces face each other to form a split nut assembly, wherein each engagement member is mounted to a pivot pin which defines a pivot axis for the engagement member, wherein the pivot axes defined by the pivot pins are parallel to each other and are transverse to a longitudinal axis defined by each engagement member, wherein the engagement members are pivotable away from each other to an initial engagement position upon movement of the threaded portion of the bolt member between the threaded surfaces of the engagement members, wherein pivoting movement of the engagement members permits the bolt member to be advanced between the engagement members in an axial direction without rotation of the bolt member, and wherein the engagement members are arranged such that subsequent rotating advancement of the threaded portion of the bolt member between the threaded surfaces of the engagement members is operable to draw the engagement members together to wedge the threaded portion of the bolt member between the threaded surfaces of the engagement members, wherein the engagement members are movable about their respective pivot axes apart from each other in response to axial advancement of the threaded portion of the bolt member therebetween, and are movable toward each other upon rotatable advancement of the bolt member therebetween;

wherein the bolt member is adapted for mounting to the door by a mounting arrangement providing axial movement of the bolt member relative to the door along a longitudinal axis defined by the threaded portion of the bolt member, wherein the bolt member is axially movable relative to the door between the engagement members for advancing engagement of the threaded portion of the bolt member with the engagement members; and a biasing element interposed between the door and the bolt member for biasing the threaded portion of the bolt member toward the door, wherein axial movement of the bolt member relative to the door is caused by manual engagement of the bolt member by a user and movement of the bolt member against the force of the biasing element for advancing engagement of the threaded portion of the bolt member with the engagement members.

24. In a door arrangement for an enclosure, wherein the door arrangement includes a door movable between an open position and a closed position in which the door is located adjacent stationary wall structure associated with the enclosure, the improvement comprising:

a locking member mounted to the door, wherein the locking member includes a shank defining a series of engagement ridges thereon;

a pair of engagement members, each of which defines an end having engagement structure engageable with the engagement ridges of the locking member; and a mounting arrangement for securing the engagement members to the stationary wall structure, comprising mounting wall structure secured to and extending outwardly from the stationary wall structure, wherein each engagement member is pivotably mounted to the stationary wall structure by means of a pivot pin secured to the engagement member and fixed in position relative to the stationary wall structure by means of the mounting wall structure, and further comprising a biasing member interposed between the mounting wall structure and the each engagement member for biasing the engagement members toward the stationary wall structure;

wherein the shank of the locking member is movable between and into engagement with the ends of the engagement members to pivot the engagement members away from each other about pivot axes defined by the pivot pins, and wherein the biasing members function to maintain the ends of the engagement members in engagement with the shank of the locking member.

* * * * *

UNITED STATES PATENT AND TRADEMARK OFFICE
CERTIFICATE OF CORRECTION

PATENT NO: 6,106,035

DATED: August 22, 2000

INVENTORS: DAVID L. HETHERINGTON

It is certified that error appears in the above-identified patent and that said Letters Patent are hereby corrected as shown below:

IN THE CLAIMS

CLAIM 1, column 8, line 35, after "shank" insert -- , --; CLAIM 3, column 8, line 58, before "opening" insert -- the --; CLAIM 20, column 13, line 20, delete "locking arrangement" and substitute therefor -- improvement --.

Signed and Sealed this

Seventeenth Day of April, 2001

*Attest:*

NICHOLAS P. GODICI

*Attesting Officer*     Acting Director of the United States Patent and Trademark Office